Figure 3:
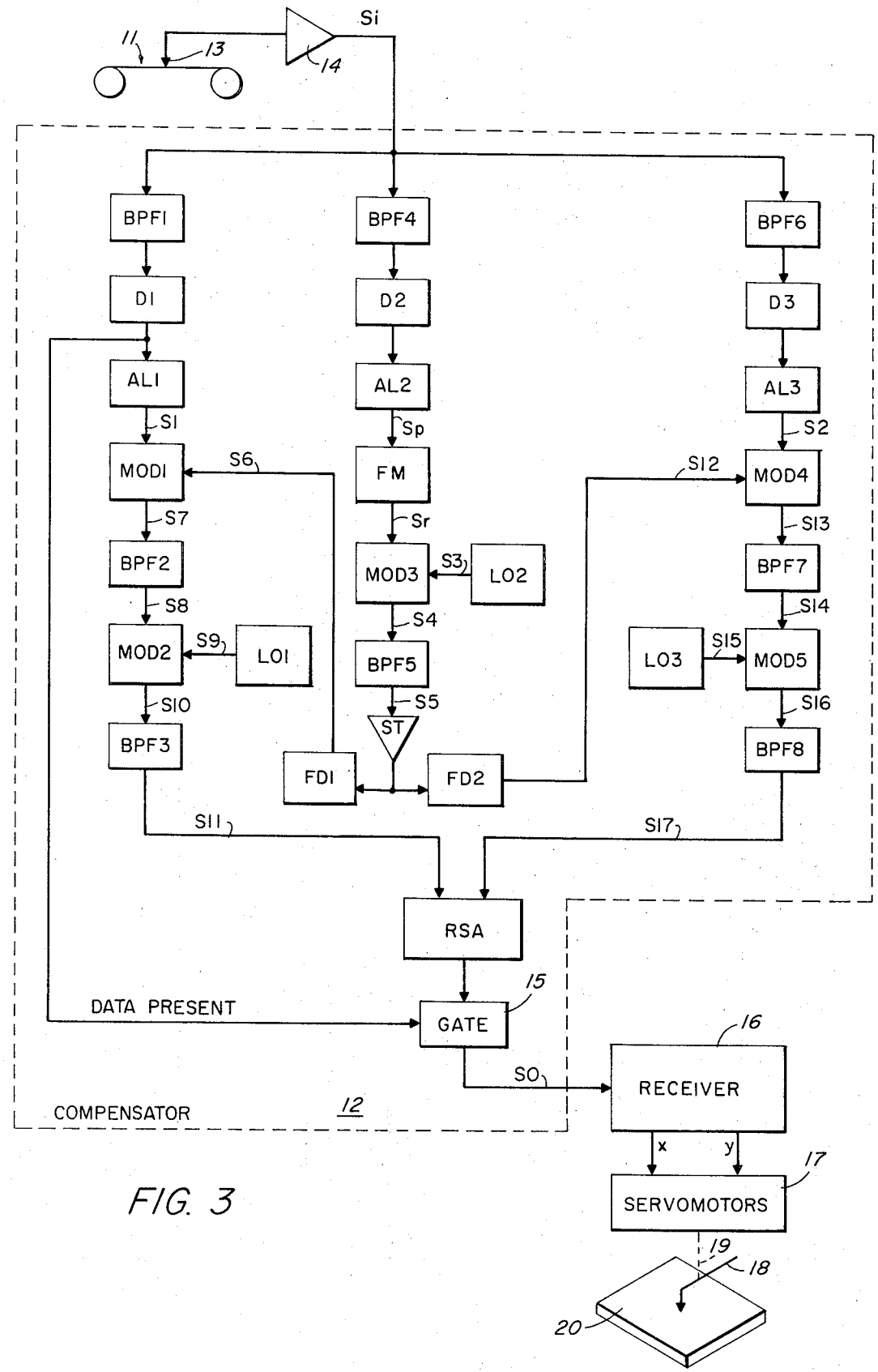

United States Patent [19]
Gross et al.

[11] 3,810,188
[45] May 7, 1974

[54] FREQUENCY DEVIATION COMPENSATION SYSTEM

[75] Inventors: T. A. O. Gross, Lincoln; Stewart W. Wilson, Concord, both of Mass.

[73] Assignee: Polaroid Corporation, Cambridge, Mass.

[22] Filed: Oct. 2, 1972

[21] Appl. No.: 294,316

[52] U.S. Cl....... 346/33 MC, 178/19, 179/100.2 K, 332/22, 340/174.1 B, 346/74 M
[51] Int. Cl. ............................................. G11b 31/00
[58] Field of Search .......... 346/33 R, 33 M, 33 MC, 346/1; 179/100.2 R, 100.2 S, 100.2 K; 340/174.1 B, 174.1 H; 178/18, 19, 20; 332/22, 18

[56] References Cited
UNITED STATES PATENTS

| | | | |
|---|---|---|---|
| 2,668,283 | 2/1954 | Mullin | 340/174.1 |
| 2,839,615 | 6/1958 | Sarratt | 179/100.2 |
| 3,361,976 | 1/1968 | Konian | 325/421 |
| 3,425,140 | 2/1969 | Dillon et al. | 346/33 MC X |
| 3,433,903 | 3/1969 | Murray et al. | 179/100.2 |
| 3,582,956 | 6/1971 | Huston et al. | 346/33 MC |
| 3,665,321 | 5/1972 | Michnik | 328/163 X |

Primary Examiner—Joseph W. Hartary

[57] ABSTRACT

A compensation system for reducing the effects of frequency deviations, produced by wow and flutter, for example, in recorded signals. The information signals are recorded together with a signal at a pilot frequency. In reproduction, signals derived from the information and pilot signals are cross-modulated to substantially diminish the frequency deviations experienced as a result of relative differences in recording and playback speeds.

19 Claims, 4 Drawing Figures

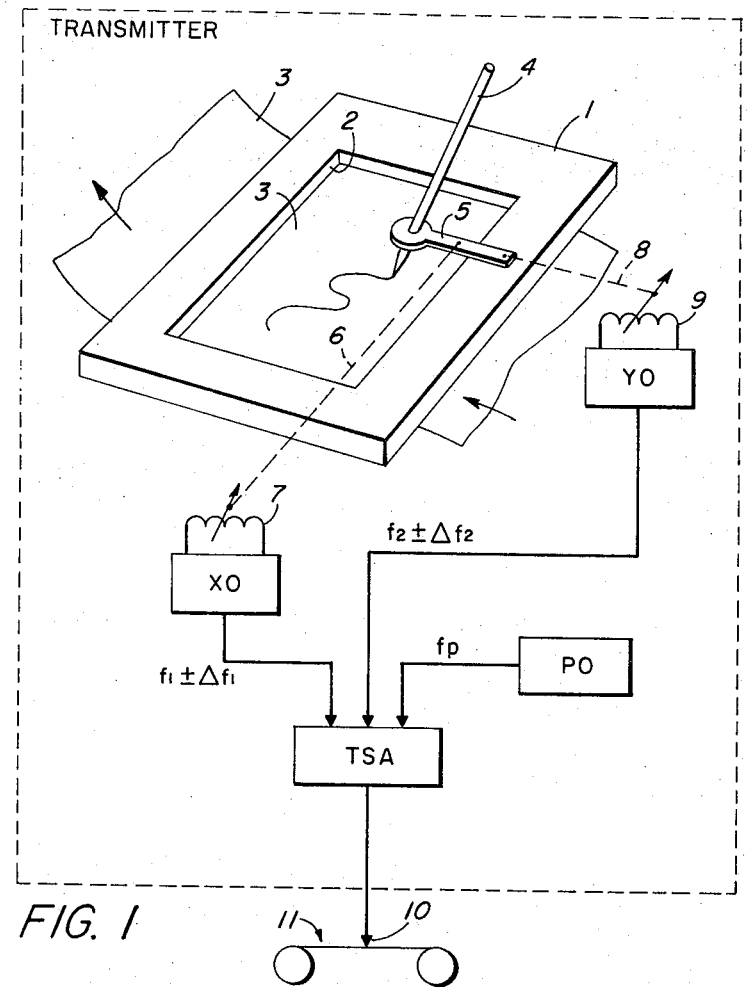
FIG. 1
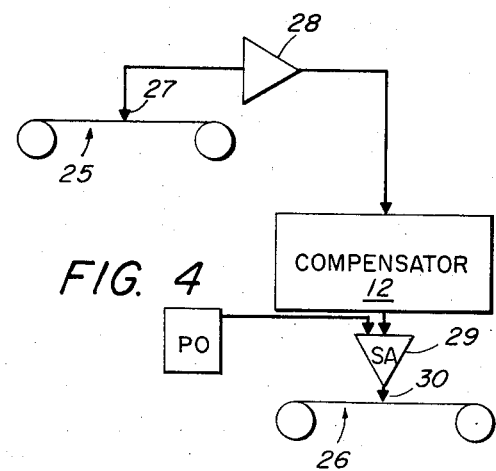
FIG. 2
FIG. 4

FREQUENCY DEVIATION COMPENSATION SYSTEM

This invention relates to telemetry, and particularly to a novel compensation system for reducing the effects of wow and flutter in transcribing recorded frequency modulated signals.

A carrier signal modulated at a low frequency, in the range from 0 to several hundred Hz, is an especially desirable vehicle for the transmission of a wide class of analog signals representing relatively slowly varying conditions, such as temperature, pressure, position, electrocardial voltages, seismic conditions, and the like. Where the value of a condition may remain constant for a time, or change only rather slowly, amplitude modulated signals present difficulties in transmission because it is necessary to control levels precisely in order to avoid the loss of information.

Frequency modulated signals would also be highly desirable for recording information, because they are less subject to distortion by the variations in recording and reproducing levels which are usually more or less inherent in the recording process. In particular, magnetic recordings typically suffer from the more or less frequent occurrence of so-called signal drop-outs, when a flaw in the magnetic recording medium causes the signal to drop drastically in level, or to dissappear entirely for a brief interval.

However, in a recording and reproducing process of the usual kind in which information is stored by sweeping a transducer relative to a record, and reproduced by moving another transducer relative to the record to recapture the information, it is inherently difficult to maintain an exact correspondence between the recording speed and the playback speed. The result is a shift in the frequency of the reproduced information relative to the recorded information, a phenomenon generally characterized as wow when it results in a frequency deviation in a range from about 0 to 1 cycles per second, and as flutter when it occurs in the range from about 1 to 100 cycles per second or more. Since these unwanted frequency deviations are precisely in the information band which it is desired to reproduce as faithfully as possible, the problems presented have prevented the widespread adoption of frequency modulation for many purposes otherwise highly suited to its use.

As a particular example, facsimile apparatus has been developed comprising a recording transmitter at which an operator can write a mssage on a record sheet with a pen, and thereby produce not only a written record, but electrical signals which repeat the position of the pen. These signals are transmitted to a receiver, comprising a recorder that is also provided with a pen which moves over a sheet of paper under the control of a mechanism that responds to the position signals provided by the transmitter to reproduce the recorded message at a distant location.

Such apparatus is well suited to many message transmission applications in which the transmitter and receiver can be connected directly by wires, or other wide band transmission line. It has even been successfully applied to the telephonic communication of recorded handwritting signals over a relatively narrow bandwidth channel. However, prior to this invention, there has not been available any satisfactory way in which the signals from such a facsimile transmitter can be recorded and later replayed to the receiver for reproduction at a different time.

Numerous useful applications for such recordings are at hand. For example, a number of handwritten messages could be accumulated in a recorder and then played back in sequence over a telephone line for reproduction at a distance. A salesman could use a facsimile transmitter for writing a sequence of orders, which is recorded on a portable tape recorder, could be accumulated in considerable numbers and transmitted more readily than the original forms on which they were written. As further examples, U. S. applications for Letters Pat. Ser. No. 294,475, for Interactive Teaching System, and Ser. No. 294,487, for Methods and Apparatus for Interactive Communication, both filed on the same day as the present application by Stewart W. Wilson and John W. Erickson and by Stewart W. Wilson respectively, and assigned to the assignee of this application disclose communication systems and methods with which a significant advantage is obtained by the inclusion of a facsimile receiver as part of the communication apparatus. This apparatus requires recordings of facsimile pen position signals to facilitate the reproduction of handwritten drawings, sketches and messages.

Recordings of such signals can be reproduced with some success by the use of relatively expensive precision tape decks in which the percentages of wow and flutter are held to extremely small levels. However, a flutter component of a quarter of a percent can drastically degrade the results, and the usual commercial ape recorders, such as would be most desirable for the widespread use of facsimile recordings, do not produce useful results at all. The effects of moderate irregularities in capstan friction, loading effects on the recording tape reels, and speed variations in the drive system, ordinarily result in wow and flutter at levels that degrade the position signals to, and frequently below, the level of intelligibility. And even minor amounts of wow and flutter destroy the aesthetic effect of the reproduction.

The difficulty is that the facsimile signals are produced as frequency modulations in the range of 0 to 150 cycles per second on a carrier in the neighborhood of 1,000 to 4,000 cycles per second, because that is higly desirable for the reasons noted above, and because such signals are quite satisfactory either for direct wire or direct telephonic communication. However, common contaminating flutter frequency components of, say, 20, 30, and 60 cycles per second, are exactly in the range of the information, and thus in many cases destroy it.

It is the object of this invention to make it possible to record and reproduce low frequency modulations on an audio carrier, or indeed on frequency modulated signals in any band in which the modulating frequency is a relatively minor fraction of the carrier frequency. A further object of the invention is to bring the advantages of frequency modulation into applications in which slowly changing signals are to be recorded and reproduced, so that such signals can be recorded and reproduced in systems that do not have extremely precise speed control provisions to lock the playback speed to the recording speed.

Briefly, the above and other objects of the invention are obtained by a frequency compensation system in which a plurality of information signals, each modulated on a different carrier by varying the frequency of the carrier over a range that is relatively small with respect to the carrier frequency, are recorded together with a reference signal at a fixed frequency. The use of recorded reference signal with information signals as an aid in reducing or removing the effects of wow and flutter as well known, and, as such, forms no part of this invention. However, the invention does relate to a compensator in which dynamic compensation is achieved by a novel method that differs from those prior art schemes which have been proposed in that circuits having fixed predetermined frequency characteristics may be employed, and in that compensation is accomplished prior to demodulation.

Prior to this invention, various approaches to the flutter compensation problem have been proposed, including systems in which an effort is made to track the frequency of the reproduced signal with a variable frequency oscillator, using phase locked loops, or in which an attempt is made to track the phase of the signal with variable delay lines. With such apparatus, it is, in theory, possible to completely correct wow and flutter over a very wide range. In practice, however, variable delay lines, and variable frequency oscillators, are rather difficult to manufacture to uniform standards of performance, and to maintain in operation. The difficulty is primarily because of the inherent design conflict between making a circuit that will always have a predetermined center frequency or phase delay, and yet can be varied about that frequency or delay over a useful range. And such systems have generally depended on measuring the frequency deviation introduced by wow and flutter, as by comparing the reproduced pilot frequency signal with a reference signal at the recorded pilot frequency, and then using that measurement to apply a correction to the information signal. That introduces the difficulty of making a measurement accurately, while maintaining an accurate relationship between the measurement and the control effect exerted by the measurement so that the result will be as intended.

In accordance with the present invention, a compensator is constructed in which the frequency deviation experienced between recording and playback is not measured, but is automatically discarded. That is accomplished by circuit means which modify the frequency of the reference signal into agreement with the various invention carrier signal frequencies, in a different circuit for each such information carrier frequency, and then cross modulate the information and reference signals to produce side bands in which the deviation frequencies introduced by wow and flutter do not appear. In order to avoid the filtering problems inherent in dealing with separation of closely adjacent side bands with relatively broad spectra, a stand-off frequency is introduced in an intermediate stage of modulation, and later removed, so that the filtering required in the several stages of operation of the apparatus is facilitated.

The manner in which the invention is preferably carried into practice will be best understood in the light of the following detailed description, together with the accompanying drawings, of a preferred embodiment thereof.

In the drawings,

FIG. 1 comprises a schematic block diagram, of a facsimile transmitter suitable for use in preparing recordings for compensated reproduction in accordance with the invention;

FIG. 2 comprises a set of three approximate reproductions of facsimile recordings, in which FIG. 2a comprises a direct record as made at the transmitter, FIG. 2b comprises a compensated reproduction of the pattern of FIG. 2a, and FIG. 2c comprises an uncompensated reproduction of the pattern of FIG. 2a made on a commercially available tape recorder and reproduced on a commercially available facsimile receiver;

FIG. 3 is a schematic block and wiring diagram of a compensating record reproducing system in accordance with the invention; and FIG. 4 is a schematic diagram of a system for making duplicate tapes in accordance with the invention.

FIG. 1 shows schematically the essential elements of a facsimile transmitter, which may be a conventional commercially available device such as the Electrowriter facsimile transmitter made by the Victor Comptometer Corporation of Chicago, Ill. Basically, the transmitter comprises a housing including a frame portion 1 formed with a generally rectangular aperture 2 that defines a wiring space in which a portion of a strip of recording paper 3 appears.

The paper 3 is supplied from a suitable roll, and may be periodically advanced relative to the aperture 2 to expose fresh surfaces for writing. The apparatus further comprises a stylus in the form of a pen 4 with which a message or a sketch or other material may be written on the paper 3 by an operator.

The pen 4 is inserted for this purpose into a follower 5 mounted for movement relative to the frame 1 and connected to a pair of position signal transducers. As here shown, a first connection schematically indicated at 6 is made between the follower 5 and a ferromagnetic element that varies the inductance of an electromagnetic coil 7.

The coil serves as the frequency determining element of a variable frequency oscillator X0 having a center frequency $f_1$ about which frequency is varied by movements of the follower 5 along paths parallel to a reference axis; for example, an X axis, to produce an output signal at a frequency $f_1 \pm \Delta f_1$, where $\Delta f_1$ is the information component representing the X coordinate of the position of the pen 4.

A similar connection 8 is made between the follower 5 and a ferromagnetic element that varies the inductance of a coil 9. The coil 9 serves as the frequency determining element of a variable frequency oscillator YO that repeats the position of the pen 4 along another axis, such as a Y axis normal to the X axis. The oscillator YO has a center frequency $f_2$, and varies about that frequency by an amount $\pm \Delta f_2$ that represents the Y axis coordinate of the pen position 4.

In practice, the actual coordinates are non-linear in the Electrowriter transmitter described, and these non-linearities are compensated in the receiver by inversion. However, for simplicity of description, it will be assumed that rectangular coordinate axes are involved.

A conventional pilot oscillator PO produces a signal at a fixed frequency $fp$. The signals from the oscillators XO, YO and PO are combined in a summing amplifier TSA, and from there supplied to a conventional recording head schematically designated 10 for recording on a medium here schematically illustrated as a magnetic tape generally designated 11.

An frequencies within the capabilities of the recording systems to be used may be employed, but it is preferred to stay within the range that can be accommodated on telephone lines, to extend the facility of that form of communication to the user of the invention. For that purpose, typical preferred frequencies for use in recording the signals described are $f_1 = 1,400$ Hz, $f_2 = 2,200$ Hz, and $fp = 3,080$ Hz. The frequency $f_1$ may be varied by a plus or minus 90 Hz, and the frequency $f_2$ may be varied by a plus or minus 140 Hz, to achieve compatible levels of modulation on the two carriers. These frequencies are selected because at least their lower harmonics are not apt to cause cross modulation.

FIG. 2a is essentially a tracing made from the word "TEST" written on a sheet 3 in a transmitter such as that shown in FIG. 1. It represents the original work of the author, and is the standard by which reproductions may be judged. FIG. 2c shows the signal produced on a facsimile receiver in response to signals produced as the writing of FIG. 2a was done, recorded on a commercial tape recorder cassette, and then played back for application of the receiver.

Recorded reproductions muct better, and very considerably worse, than that shown in FIG. 2c may be encountered, but the sort of distortion illustrated was the motivating factor behind the search for this invention. FIG. 2b is a tracing of a reproduction made by a commercial facsimile receiver in response to the same recorded signals used to produce the reproduction of FIG. 2c, except that between the tape recorder playing back the signals and the receiver there was installed a compensator of the type next to be described.

FIG. 3 shows a reproduction system comprising a compensator 12 with which the frequency deviations introduced by the recording and reproduction speed differences of signals from a transmitter such as that shown on FIG. 1 can be greatly reduced. As shown, the signals recorded on the tape 11 in the manner described above are reproduced by a playback head 13, moved relative to the tape 11 by any conventional tape recorder drive mechanism, and applied to a preamplifier 14.

The output signal $Si$ from the amplifier 14 contains the two information signal frequencies and the reference pilot signal frequency $fp$, all multiplied by a factor $N_2/N_1$, where $N_2$ is the instantaneous speed of the playback head relative to the tape 11, and $N_1$ is the instaneous speed of the recording head 10 relative to the tape 11.

The signal Si is applied in parallel to three band pass filters BPF1, BPF4 and BPF6. The filter BPF1 is selected to have a pass band adequate to accommodate the frequency $f_1 \pm \Delta f_1$, and to reject the other frequency components present. Similarly, the filter BPF4 is selected to pass the frequency $fp$, and the filter BPF6 is selected to pass the frequency $f_2 \pm \Delta f_2$.

The pass bands of each of the filters BPF1, BPF4 and BPF6 must also be wide enough to accommodate the maximum excursion of the applied signals due to differences between $N_2$ and $N_1$, As the worst wow and flutter situations to be expected. as an example, a one percent speed error in a tape recorder can be considered to be extremely bad, so that the worst expected range of $N_2/N_1$ is about from 0.99 to 1.01.

Each of the filters BPF1, BPF4 and BPF6 effects a phase shaft in the applied signals, which may be expressed as delays D1, D2 and D3 associated with the filters BPF1, BPF4 and BPF6, respectively. These delays should be made equal, if necessary by including physical delay lines in the location of at least two of the blocks D1, D2 and D3. However, in practice it is preferred to design the filters to have equal delays. That can be accomplished by conventional design techniques while maintaining the pass band characteristics desired. The purpose of matching these delays D1, D2 and D3 is to insure that corrections are applied in the proper phase, i.e., at any given instant the pilot frequency signal will be shifted in frequency by an amount proportional to the shift in the frequency of the information signals, and it is that shift that is significant, rather than the shift that may be experienced at some other time.

The delayed output of the filter BPF1, or, if desired, of either of the other filters BPF4 and BPF6, is preferably applied to a gate schematically indicated at 15. The gate 15 serves to switch the output signal of the compensator 12 off when no signal above a predetermined threshold level is produced by the filter BPF1.

It will be apparent to one skilled in the art, from a consideration of the following description, that in the absence of an input signal the apparatus of the compensator 12 may generate its own random signal. But at any time when information in the form of a signal $Si$ is being applied to the compensator, the carrier frequencies and the pilot frequency will always be present at a useful level. Accordingly, this threshold detection control of the gate 15 is employed to prevent such random output signals from producing meaningless reproductions.

In practice, the gate 15 may be a conventional electronic switch, or it may comprise a threshold detecting circuit controlling an amplifier that supplies energizing current to actuate a relay. The relay may be provided with contacts connected to close an output circuit for the compensator when a signal is present.

The delayed output signal from the filter BPF1 is also applied to an amplifier limiter AL1, of any conventional construction, which limits the applied signal to a predetermined amplitude and thereby provides a signal $S_1$ that is essentially a square wave at the information signal frequency $f_1 \pm \Delta f_1$. The signal $S_1$ is applied to one input terminal of a conventional modulator MOD1, wherein it is modulated with a second signal $S_6$ produced in a manner to be described below.

The modulator MOD1, together with other modulators to be described, may be of any conventional construction, but preferably comprises an electronic switch which is controlled by the applied signal such as $S_6$ to chop the other applied frequency such as $S_1$ at a rate determined by the frequency of the signal $S_6$. The modulation product, illustrated as a signal $S_7$ in FIG. 3, has numerous components, but in particular has two strong signal components at the frequencies of the sum and difference of the frequencies of the signals $S_1$ and $S_6$.

In the embodiment to be described, the upper side band, comprising the sum signal, is selected by a band pass filter BPF2. As it will appear, the signal $S_8$ thus selected is compensated, but is at a center frequency other than the desired final center frequency. The signal $S_8$ is applied to another modulator MOD2, where it is modulated by a signal $S_9$ from a local oscillator LO1.

The output signal from the modulator 2 again contains sum and difference frequency components, as well as other modulation products. In the illustrated embodiment, the difference frequency is selected by a band pass filter BPF3, to produce a signal $S_{11}$ which corresponds to the compensated signal at the center frequency, $f_1$. As will appear, the compensation is not perfect, but is quite adequate for most applications. This signal is applied to one input terminal to a receive summing amplifier RSA.

The delayed output signal from the filter BPF4 is applied to an amplifier limiter AL2, which produces a limited output signal at predetermined fixed amplitude identified as S$p$ in FIG. 3, which has a fundamental frequency equal to the pilot frequency $fp$ deviated by the ratio $N_2/N_1$. This signal S$p$ is supplied to any conventional frequency multiplier FM.

The frequency multiplier may be a pulse generator arranged to produce a predetermined number of pulses for each cycle of the signal S$p$, but in a presently preferred embodiment comprises a harmonic selector that generates and transmits the fifth harmonic of the signal S$p$ to provide a reference signal S$r$ at a frequency five times the frequency of the signal S$p$. AS will appear from the theoretical discussion below, the number five is not critical, and other numbers can be selected from considerations to be described.

The signal S$r$ is modulated in a conventional modulator MOD3 by a signal $S_3$ from a local oscillator LO2 at a frequency that is higher than the frequency S$r$ in the presently preferred embodiment. For example, if the frequency S$r$ is 15,400 Hz, the frequency of the signal $S_3$ may be 35,000 Hz. The signal $S_4$ produced by the modulator 3 has sum and difference frequency components corresponding to the sum and difference of the frequencies of the signals S$r$ and $S_3$.

The difference frequency side band is selected by a band pass filter BPF5 and applied to a conventional SChmitt trigger circuit ST to produce a square wave output signal at the difference frequency, which in the illustrated embodiment was 19,600 Hz. This signal $S_5$ produced by the Schmitt trigger is applied to two frequency dividers FD1 and FD2, of any conventional design.

Such frequency dividers may take any of the forms known to those skilled in the art, but in a preferred embodiment they each comprise a conventional binary counter modified by the inclusion of gates in a conventional manner to cause the counters to recycle at selected counts. In particular, the frequency divider FD1 was a binary counter arranged to recycle at each eleventh count, and the frequency divider FD2 was a binary counter gated to recycle at each seventh count. The signal $S_6$ produced by the frequency divider FD1 has a frequency 1/11 of the frequency of the signal $S_5$, and the frequency of the signal $S_{12}$ produced by the divider FD2 has a frequency 1/7 of the frequency of the signal $S_5$. The significance of these factors will be described below.

The delayed output from the band pass filter BPF6 is applied to an amplifier limiter AL3, to produce a square wave output signal $S_2$ at a predetermined amplitude and at the frequency of the information signal $f_2$ as modified by its information modulation component and as shifted by the factor $N_2/N_1$. This signal $S_2$ is modulated in a conventional modulator MOD4 by the signal $S_{12}$ from the frequency divider FD2. The output signal $S_{13}$ is applied to the band pass filter BPF7, which selects the upper side band to produce a signal $S_{14}$ at the sum frequency of the frequencies $S_2$ and $S_{12}$.

This signal $S_{14}$ is now compensated for flutter and wow, but is at a center frequency other than the desired frequency $f_2$. It is applied to a modulator MOD5, of conventional design, where it is modulated by a signal $S_{15}$ provided by a local oscillator LO3.

The signal $S_{16}$ produced by the modulator MOD5 has a lower side band that is compensated for wow and flutter and has a center frequency $f_2$. This side band is selected by a band pass filter BPF8 to provide a compensated Y axis output signal $S_{17}$ that is applied to the summing amplifier RSA. The combined signals $S_{11}$ and $S_{17}$ applied to the amplifier RSA are applied through the gate 15, which is closed when data is present is indicated by a signal above the threshold value from the filter PBF1, to a conventional receiver 16, wherein it is demodulated and transformed into position signals X and Y. These signals X and Y are applied to conventional position control circuits for servomotors 17. The servomotors 17 have output shafts connected to a recording pen 18, by means schematically indicated at 19, to move the pen 18 over a record sheet 20 and reproduce the handwriting represented by the recorded and reproduced signals. The receiver 16, servomotors 17, and the recording pen actuated thereby, may comprise any conventional facsimile receiver, such as the Electrowriter facsimile receiver produced by the Victor Comptometer Corporation of Chicago, Ill.

Operation of the apparatus of the invention will next be discussed in the context of an heuristic theoretical explanation, which should be regarded as illustrative and not limiting.

The frequencies of the information carrier signals may be expressed as:

$$f_1 = np$$

and $$f_2 = mp$$

where $m$, $n$ and $p$ may be any numbers such that $np$ and $mp$ are in a recordable and reproducible frequency range. The factors $m$ and $n$ are conveniently, but not necessarily, different prime integers, and $m$, $n$ and $p$ are preferably selected such that $np$, $mp$ and their lower harmonics (say, to the seventh) are different and readily separable.

The pilot frequency is chosen to be:

$$fp = mnp/K$$

where K is preferably, but not necessarily, an integer so chosen that $fp$ is recordable and reproducible, and such that $fp$ and its lower harmonics are distinct from $f_1$ and $f_2$ and their lower harmonics. For example, if $f_1$ = 1,400 Hz, $f_2$ = 2,200 Hz and $fp$ = 3,080 Hz, then $p$ = 200, $m$ = 11, and $n$ = 7. In the particular embodiment described, K = 5.

The frequency of the signal $S_1$ in FIG. 3 may be expressed as:

$$S_1 = (N_2/N_1)(f_1 \pm \Delta f_1) = (N_2/N_1)(np \pm \Delta f_1)$$

Where $N_2$ and $N_1$ are the playback and recording speeds, respectively, and $\Delta f_1$ is the information content. Similarly, $$S_2 = (N_2/N_1)(mp \pm \Delta f_2)$$

and $$Sp = N_2 mnp/N_1 K$$

If the frequency multiplier FM IN FIG. 3 has a multiplication factor K, $$Sr = N_2 mnp/N_1$$

The frequencies of the signal $S_4$ contain the set:

$$S_4 = \begin{pmatrix} S_3 - Sr \\ S_3 + Sr \end{pmatrix}$$

The lower side band is selected by the filter BPF5 to give $$S_5 = S_3 - Sr$$

The frequency divider FD1 divides by the factor $m$ to give $$S_6 = (S_3/m) - (Sr/m) = (S_3/m) - (N_2 np/N_1)$$

The frequencies of the modulation product of the modulator MOD1 contain the set:

$$S_7 = \begin{pmatrix} S_1 + S_6 \\ S_6 - S_1 \end{pmatrix}$$

The filter BPF2 selects the upper side band to give $$S_8 = S_1 + S_6 + (N_2/N_1)(np \pm \Delta f_1) + (S_3/m) - (N_2 np/N_1)$$

$$S_8 = (S_3/m) \pm (N_2/N_1) \Delta f_1$$

In $S_8$, the shifted carrier frequency component $N_2 np/N_1$ has been canceled, and the shifted information is now centered about the frequency $S_3/m$.

The frequencies of the modulation product of the modulator MOD2 contain the set:

$$S_{10} = \begin{pmatrix} S_8 - S_9 \\ S_9 + S_9 \end{pmatrix}$$

The lower side band is selected by the filter BPF3 to give:

$$S_{11} = S_8 - S_9 = (S_3/m) \pm (N_2/N_1) \Delta f_1 - S_9$$

The local oscilalator frequency $S_9$ is selected to make $$S_{11} = np \pm (N_2/N_1) \Delta f_1$$

Thus, $$S_9 = (S_3/m) \pm (N_2/N_1) \Delta f_1 - np \mp (N_2/N_1) \Delta f_1$$
$$S_9 = (S_3/m) - np$$

In the example described, $S_3 = 35,000$ and thus $S_9 = (35,000/11) - 1,400 = 1,780$ Hz.

The frequency divider FD2 divides by the factor $n$. Thus $$S_{12} = (S_5/n) = (S_3/n) - (N_2 mp/N_1).$$

The frequencies of the modulation product of the modulator MOD4 contain the set:

$$S_{13} = \begin{pmatrix} S_2 + S_{12} \\ S_2 - S_{12} \end{pmatrix}$$

The filter BPF7 selects the upper side band to give $$S_{14} = S_2 + S_{12} = (N_2/N_1)(mp \pm \Delta f_2) + (S_3/n) - N_2 mp/N_1$$

$$S_{14} = (S_3/n) \pm (N_2/N_1) \Delta f_2$$

Again, the flutter-shifted carrier component $N_2 mp/N_1$ has been canceled, and the shifted information component $\pm (N_2/N_1) \Delta f_2$ is centered about the frequency $S_3/n$.

The frequencies of the modulation product of the modulator MOD5 contain the set:

$$S_{16} = \begin{pmatrix} S_{14} - S_{15} \\ S_{14} + S_{15} \end{pmatrix}$$

The filter BPF 8 selects the lower side band to give $$S_{17} = S_{14} - S_{15} = (S_3/n18 \pm (N_2/N) \Delta f_2 \pm S_{15}$$

The frequency of the local oscillator LO3 is selected to make $$S_{17} = mp \pm (N_2/N_1) \Delta f_2$$

Thus, $S_{15} = (S_3/n) \pm (N_2/N_1) \Delta f_2 - mp \mp (N_2/N_1) \Delta f_2$ $$S_{15} = (S_3/n) - mp$$

Note that this choice of $S_{15}$ does not imply a knowledge of $N_2$, $N_1$, or $f_2$. In the example given, with $S_3 = 35,000$, $S_{15} = 2,800$ Hz.

The choices of the frequencies of $S_3$, $S_9$ and $S_{15}$ are interdepenedent. Basically, it is desired to separate $S_9$ from $f_1$, and $S_{15}$ from $f_2$, by convenient factors. Thus, let $$S_9 = f_1 + a$$
$$S_{15} = f_2 + b$$

Then $$(S_3/m) - np = np + a$$
$$(S_3/m) - mp = mp + b$$
$$S_3 = 2mnp + am = 2mnp + nb$$
$$a = nb/m$$

Thus, $$S_9 = np + (nb/m) = n[p + (b/m)]$$

It will be noticed that information components of the reproduced signals are not compensated, and that the correction basically resides in bringing the carrier signal back to the frequency at which it was recorded. The residual percent error in the compensated signal, $f_1$, for example, based on the information content, is given by $$Ec = (100 \Delta f_1/\Delta f_1)[1-(N_2/N_1)] = 100 [1-(N_2/N_1)]$$

In contrast, the error in the uncompensated signal is given by $$Eu = [100 (f_1 \pm \Delta f_1)/\Delta f_1][1-(N_2/N_1)]$$

The improvement effected by the methods and apparatus of the invention may be expressed as $$C_f = Eu/Ec = (f_1/\Delta f_1) \pm 1$$

For example, for 10 percent modulation, or $\Delta f_{1\,max} = 0.1 f_1$, $C_f = 11$ for one extreme case ($f_1 = \Delta f_{1max}$) and 9 for the other ($f_1 - \Delta f_{1max}$).

To illustrate the difference effected by compensation in accordance with the invention, assume that 2,200 Hz is the frequence at which the transmitter pen 4 is centered along the Y axis, and that it is moved halfway toward one side so that the recorded Y axis frequency is 2,270 Hz. If there is one percent speed difference between recording and playback, the compensated signal will at worst be 2,270.7 Hz or 2,269.3 Hz, an error in position that is quite tolerable. On the other hand, the uncompensated signal would be at 2,293 or 2,247 Hz, an unintelligible distortion.

The methods and apparatus of the invention are also applicable to the preparation of duplicate recordings from master recordings. Where it is desired to produce copies of an original recording, the effects of wow and flutter on a recorded signal are compounded by the successive recording, playback, and re-recording stages.

FIG. 4 shows apparatus for minimizing the effects in transcribing from one recorder to another. More specifically, the apparatus comprises means for transforming signals recorded on a tape diagrammatically shown at 25 onto a tape diagrammatically shown at 26. The signals on the tape 25 are recorded together with a pilot frequency for the purpose described above.

Signals from the tape 25 are picked up by a playback head schematically shown at 27 and supplied to an amplifier 28. The output signal from the amplifier 28 is supplied to a compensator 12, which may be of the form shown in FIG. 3.

In the compensator 12, the frequency deviations produced during the recording and playback of the signals on the tape 25 are reduced, so that the output signals, applied through a summing amplifier 29 to a recording head 30, may be recorded on a tape 26 with a fidelity approaching that of the original recording on the tape 25.

The summing amplifier is also supplied with a signal at the pilot frequency from a pilot oscillator PO, is described above in connection with FIG. 1. Thus, the signals on the tape 26 may also be compensated when they are reproduced.

While the invention has been described with reference to the specific details of preferred embodiments, many changes and variations will occur to those skilled in the art upon reading this description. Such can obviously be made without departing from the scope of the invention.

Having thus describe the invention, what is claimed is:

1. Apparatus for reproducing first and second frequency modulated information signals that have been recorded on a record simultaneously with a reference signal at constant frequency, said information signals comprising carrier signals at different center frequencies each modulated in frequency over a narrow band relative to the center frequency, said apparatus comprising transducer means for simultaneously reproducing said signals with wow and flutter deviations, means selectively responsive to said transducer means for producing said reproduced reference signal, means selectively responsive to said transducer means for producing said reproduced first information signal, means selectively responsive to said transducer means for producing said reproduced second information signal, means responsive to said reproduced reference signal for producing a first derived reference signal offset in frequency from the frequency of said first information signal and containing substantially the same wow and flutter deviations as said first reproduced information signal, means for combining said first derived reference signal with said first reproduced information signal to produce a first offset signal in which wow and flutter deviations are substantially cancelled, means responsive to said reproduced reference signal for producing a second derived reference signal offset in frequency from the frequency of said first information signal and containing substantially the same wow and flutter deviations as said second reproduced information signal, means for combining said second derived reference signal with said second reproduced information signal to produce a second offset signal in which wow and flutter deviations are substantially cancelled, means for modulating said first offset signal at a fixed frequency to produce a first frequency modulated output signal corresponding to said first recorded information signal, and means for modulating said second offset signal at a fixed frequency to produce a second frequency modulated output signal corresponding to said second recorded information signal.

2. Apparatus for reproducing first and second information signals, said information signals comprising carrier signals at first and second different center frequencies each modulated in frequency over a narrow band relative to the center frequency when said information signals have been recorded simultaneously with a first reference signal at a third frequency, said apparatus comprising means for simultaneously reproducing said recorded signals with wow and flutter deviation so that the wow and flutter deviations in each signal are proportional to the wow and flutter deivations in the other signals, means for producing a second reference signal at a fourth frequency, means for combining said reproduced first reference signal with said second reference signal to produce a first derived signal at a frequency offset from the frequency of said reproduced first reference signal by said fourth frequency, first frequency dividing means responsive to said first derived signal for producing a second derived signal in which wow and flutter deviations are equal in amplitude to corresponding deviations in said reproduced first information signal and having a center frequency offset from said first frequency, second frequency dividing means responsive to said first derived signal for producing a third derived signal in which wow and flutter deviations are equal in amplitude to corresponding deviations in said reproduced second information signal and having a frequency offset from said second frequency, means for combining said reproduced first signal with said second derived signal to produce a first side band signal in which wow and flutter frequency deviations are substantially cancelled, means for combining said reproduced second signal with said third derived signal to produce a second side band signal in which wow and flutter deviations are substantially cancelled, means for producing a third reference signal at a fifth fixed frequency, means for combining said third reference signal and said first side band signal to produce a first output signal corresponding in modulated frequency to said first information signal, means for producing a fourth reference signal at a sixth fixed frequency, and means for combining said forth reference signal and said second side band signal to produce a second output signal corresponding in modualated frequency to said second information signal.

3. The apparatus of claim 2 in which said first information signal has a frequency $np\pm\Delta f_1$, said second information signal has a frequency $mp\pm\Delta f_2$, said first reference signal has a frequency $mnp$, said second reference signal has a frequency $2mnp+nb$, said third reference signal has a frequency $np+(nb/m)$, and said fourth reference signal has a frequency $mp+b$, where $m$, $n$, $p$ and $b$ are constants and $\Delta f_1$, and $\Delta f_2$ are information frequency components modulated on said carriers, and in which said first frequency dividing means divides the frequency of said first derived signal by $m$, and said second frequency dividing means divides the frequency of said first derived signal by $n$.

4. The apparatus of claim 2, in which said means for combining said reproduced first reference signal with said second reference signal comprises frequency multiplying means responsive to said reproduced first reference signal for producing a signal having a frequency that is a predetermined multiple of the frequency of said first reproduced reference signal, modulating means responsive to said second reference signal for modulating the signal from said frequency multiplying means at the frequency of said second reference signal to produce a modulated signal, and filter means responsive to a predetermined side band of said modulated signal for producing said first derived signal.

5. The apparatus of claim 4, in which said first position signal has a frequency $np\pm\Delta f_1$, said second position signal has a frequency $mp\pm \Delta f_2$, said first reference signal has a frequency $mnp/K$, said second reference signal has a frequency $2mnp+nb$, said third reference signal has a frequency $np+(nb/m)$, and said fourth reference signal has a frequency $mp+b$, where $m, n, p, K$ and $b$ are constants and $\Delta f_1$ and $\Delta f_2$ are information frequency components modulated on said carriers, and in which said predetermined multiple is $K$, said first frequency dividing means divides the frequency of said first derived signal by $m$, and said second frequency dividing means divides the frequency of said first derived signal by $n$.

6. Apparatus for reproducing first and second frequency modulated information signals that have been recorded on a record as carrier signals at different center frequencies each modulated in frequency over a narrow band relative to the center frequency simultaneously with a reference signal at constant frequency, comprising transducer means for simultaneously reproducing said signals with wow and flutter deviations, first filter means selectively responsive to said transducer means for producing said reproduced reference signal with a first delay, second filter means having a delay matched to said first filter means and selectively responsive to said transducer means for producing said reproduced first information signal with said first delay, third filter means having a delay matched to said first filter means and selectively responsive to said transducer means for producing said reproduced second information signal with said first delay, means responsive to said reproduced reference signal for producing a first derived reference signal offset in frequency from the frequency of said first information signal and containing substantially the same wow and flutter deviations as said first reproduced information signal, means for combining said first derived reference signal with said first reproduced information signal to produce a first offset signal in which wow and flutter deviations are substantially cancelled, means responsive to said reproduced reference signal for producing a second derived reference signal offset in frequency from the frequency of said first information signal and containing substantially the same wow and flutter deviations as said second reproduced information signal, means for combining said second derived reference signal with said second reproduced information signal to produce a second offset signal in which wow and flutter deviations are substantially cancelled, means for modulating said first offset signal at a fixed frequency to produce a first frequency modulated output signal corresponding to said first recorded information signal, and means for modulating said second offset signal at a fixed frequency to produce a second frequency modulated output signal corresponding to said second recorded information signal.

7. Apparatus for reproducing first and second information signals, said information signals comprising carrier signals at first and second different center frequencies each modulated in frequency over a narrow band relative to the center frequency, when said information signals have been recorded simultaneously with a first reference signal at a third frequency, said apparatus comprising, means for simultaneously reproducing said recorded signals with wow and flutter deviations so that the wow and flutter deviations in each signal are proportional to the wow and flutter deviations in the other signals, first, second and third filter means having matched delays and being selectively responsive to said first and said second information signals and said reference signal, respectively, to produce corresponding equally delayed signals, means for producing a second reference signal at a fourth frequency, means for combining said delayed first reference signal with said second reference signal to produce a first derived signal at a frequency offset from the frequency of said delayed first reference signal by said fourth frequency, first frequency dividing means responsive to said first derived signal for producing a second derived signal in which wow and flutter deviations are equal in amplitude to corresponding deviations in said delayed first information signal and having a center frequency offset from said first frequency, second frequency dividing means responsive to said first derived signal for producing a third derived signal in which wow and flutter deviations are equal in amplitude to corresponding deviations in said delayed second information signal and having a frequency offset from said second frequency, means for combining said reproduced first signal with said second derived signal to produce a first side band signal in which wow and flutter frequency deviations are substantially cancelled, means for combining said delayed second information signal with said third derived signal to produce a second side band signal in which wow and flutter deviations are substantially cancelled, means for producing a third reference signal at a fifth frequency, means for combining said third reference signal and said first side band signal to produce a first output signal corresponding in modulated frequency to said first information signal, means for producing a fourth reference signal at a sixth fixed frequency, and means for combining said fourth reference signal and said second side band signal to produce a second output signal corresponding in modulated frequency to said second information signal.

8. Apparatus for reproducing handwritten inscriptions from first and second position signals representing the coordinates of the position of a pen on a record sheet as a function of time, when said position signals have been recorded as frequency modulations on first and second carriers having first and second center frequencies, respectively, simyltaneously with a first reference signal at a third frequency, said apparatus comprising, means for simultaneously reproducing said recorded signals so that wow and flutter deviations in each signal are proportional to the wow and flutter deviations in the other signals, means for producing a second reference signal at a fourth fixed frequency, means for combining said reproduced first reference signal with said second reference signal to produce a first derived signal at a frequency offset from the frequency of said reproduced first reference signal by said fourth frequency, first frequency dividing means responsive to said first derived signal for producing a second derived signal in which wow and flutter deviations are equal in amplitude to corresponding deviations in said reproduced first position signal and having a center frequency offset from said first frequency, second frequency dividing means responsive to said first derived signal for producing a third derived signal in which wow and flutter deviations are equal in amplitude to corresponding deviations in said reproduced second position signal and having a frequency offset from said second frequency, means for combining said reproduced first signal with said second derived signal to produce a first side band signal in which wow and flutter frequency deviations are substantially cancelled, means for combining said reproduced second signal with said third derived signal to produce a second side band signal in which wow and flutter deviations are substantially cancelled, means for producing a third reference signal at a fifth fixed frequency, means for combining said third reference signal and said first side band signal to produce a first output signal corresponding in modulated frequency to said first position signal, means for producing a fourth reference signal at a sixth fixed frequency, means for combining said fourth reference signal and said second side band signal to produce a second output signal corresponding in modulated frequency to said second position signal, a pen adapted to be moved to record an inscription on a record sheet, and means responsive to said output signals for moving said pen to positions determined by said output signals.

9. The apparatus of claim 8, in which said first position signal has a frequency $np\pm\Delta f_1$, said second position signal has a frequency $mp\pm\Delta f_2$, said first reference signal has a frequency $mnp$, said second reference signal has a frequency $2mnp+nb$, said third reference signal has a frequency $np+(nb/m)$, and said fourth reference signal has a frequency $mp+b$, where $m$, $n$, $p$ and $b$ are constants and $\Delta f_1$ and $\Delta f_2$ are frequency components representing said coordinates of the position of the pen, and in which said first frequency dividing means divides the frequency of said first derived signal by $m$, and said second frequency dividing means divides the frequency of said first derived signal by $n$.

10. The apparatus of claim 8, in which said means for combining said reproduced first reference signal with said second reference signal comprises frequency multiplying means responsive to said reproduced first reference signal for producing a signal having a frequency that is a predetermined multiple of the frequency of said first reproduced reference signal, modulating means responsive to said second reference signal for modulating the signal from said frequency multiplying means at the frequency of said second reference signal to produce a modulated signal, and filter means responsive to a predetermined side band of said modulated signal for producing said first derived signal.

11. The apparatus of claim 10, in which said first position signal has a frequency $np\pm\Delta f_1$, said second position signal has a frequency $mp\pm\Delta f_2$, said frist reference signal has a frequency $mnp/K$, said second reference signal has a frequency $2mnp+nb$, said third reference signal has a frequency $np+(nb/m)$, and said fourth reference signal has a frequency $mp+b$, where $m$, $n$, $p$, $K$ and $b$ are constants and $\Delta f_1$ and $\Delta f_2$ are frequency components representing said coordinates of the position of said first stylus, and in which said predetermined multiple is K, said first frequency dividing means divides the frequency of said first derived signal by $m$, and said second frequency dividing means divides the frequency of said first derived signal by $n$.

12. Apparatus for reproducing handwritten inscriptions from first and second position signals representing the coordinates of the position of a pen on a record sheet as a function of time, when said position signals have been recorded as frequency modulations on first and second carriers having first and second center frequencies, respectively, simultaneously with a first reference signal at a third frequency, said apparatus comprising, means for simultaneously reproducing said recorded signals so that wow and flutter deviations in each signal are proportional to the wow and flutter deviations in the other signals, detecting means responsive to the level of one of said reproduced signals for producing a switching signal when said level is above a predetermined value, means for producing a second reference signal at a fourth fixed frequency, means for combining said reproduced first reference signal with said second reference signal to produce a first derived signal at a frequency offset from the frequency of said reproduced first reference signal by said fourth frequency, first frequency dividing means responsive to said first derived signal for producing a second derived signal in which wow and flutter deviations are equal in amplitude to corresponding deviations in said reproduced first position signal and having a center frequency offset from said first frequency, second frequency dividing means responsive to said first derived signal for producing a third derived signal in which wow and flutter deviations are equal in amplitude to corresponding deviations in said reproduced second position signal and having a frequency offset from said second frequency, means for combining said reproduced first signal with said second derived signal to produce a first side band signal in which wow and flutter frequency deviations are substantially cancelled, means for combining said reproduced second signal with said third derived signal to produce a second side band signal in which wow and flutter deviations are substantially cancelled, means for producing a third reference signal at a fifth fixed frequency, means for combining said third reference signal and said first side band signal to produce a first output signal corresponding in modulated frequency to said first position signal, means for producing a fourth reference signal at a sixth fixed frequency, means for combining said fourth reference signal and said second side band signal to produce a second output signal corresponding in modulated frequency to said second position signal, a pen adapted to be moved to record an inscription on a record sheet, and means controlled by said detecting means and responsive to said output signals for moving said pen to positions determined by said output signals when said switching signal is present.

13. Apparatus for reproducing handwritten inscriptions from first and second position signals representing the coordinates of the position of a pen on a record sheet as a function of time, when said position signals have been recorded as frequency modulations on first and second carriers having first and second center frequencies, respectively, simultaneously with a first reference signal at a third frequency, said apparatus comprising, means for simultaneously reproducing said recorded signals so that wow and flutter deviations in each signal are proportional to the wow and flutter deviations in the other signals, first, second and third filter means having matched delays and being selectively responsive to said reproduced first and second modulated carrier signals and to said reproduced first reference signal, respectively, to produce corresponding equally delayed signals, means for producing a second reference signal at a fourth fixed frequency, means for combining said delayed first reference signal with said second reference signal to produce a first derived signal at a frequency offset from the frequency of said reproduced first reference signal by said fourth frequency, first frequency dividing means responsive to said first derived signal for roducing a second derived signal in which wow and flutter deviations are equal in amplitude to corresponding deviations in said delayed first position signal and having a center frequency offset from said first frequency, said frequency dividing means responsive to said first derived signal for producing a third derived signal in which wow and flutter deviations are equal in amplitude to corresponding deviations in said delayed second position signal and having a frequency offset from said second frequency, means for combining said delayed first position signal with said second derived signal to produce a first side band signal in which wow and flutter frequency deviations are substantially cancelled, means for combining said delayed signal with said third derived signal to produce a second side band signal in which wow and flutter deviations are substantially cancelled, means for producing a third reference signal at a fifth fixed frequency, means for combining said third reference signal and said first side band signal to produce a first output signal corresponding in modulated frequency to said first position signal, means for producing a fourth reference signal at a sixth fixed frequency, means for combining said fourth reference signal and said second side band signal to produce a second output signal corresponding in modulated frequency to said second position signal, a pen adapted to be moved to record an inscription on a record sheet, and means responsive to said output signals for moving said pen to positions determined by said output signals.

14. Apparatus for reproducing handwritten inscriptions from first and second postion signals representing the coordinates of the position of a pen on a record sheet as a function of time, when said position signals have been recorded as frequency modulations on first and second carriers having first and second center frequencies, respectively, simultaneously with a first reference signal at a third frequency, said apparatus comprising, means for simultaneously reproducing said recorded signals to that wow and flutter deviations in each signal are proportional to the wow and flutter deviations in the other signals, filter means having matched delays for separating said reproduced signals and producing corresponding first delayed position, aid second delayed position and first delayed reference signals with equal delays, means responsive to one of said delayed signals for producing a gating signal when said one delayed signal is present, means for producing a second reference signal at a fourth fixed frequency, means for combining said first delayed reference signal with said second reference signal to produce a first derived signal at a frequency offset from the frequency of said reproduced first reference signal by said fourth frequency, first frequency dividing means responsive to said first derived signal for producing a second derived signal in which wow and flutter deviations are equal in amplitude to corresponding deviations in said first delayed position signal and having a center frequency offset from said first frequency, second frequency dividing means responsive to said first derived signal for producing a third derived signal in which wow and flutter deviations are equal in amplitude to corresponding deviations in said second delayed position signal and having a frequency offset from said second frequency, means for combining said first delayed position signal with said second derived signal to produce a first side band signal in which wow and flutter frequency deviations are substantially cancelled, means for combining said second delayed signal with said third derived signal to produce a second side band signal in which wow and flutter deviations are substantially cancelled, means for producing a third reference signal at a fifth fixed frequency, means for combining said third reference signal and said first side band signal to produce a first output signal corresponding in modulated frequency to first position signal, means for producing a fourth reference signal at a sixth fixed frequency, means for combining said fourth reference signal and said second side band signal to produce a second output signal corresponding in modulated frequency to aid second position signal, a pen adapted to be moved to record an inscription on a record sheet, control means responsive to applied position signals for moving said pen to positions determined by said position signals, and gating means responsive to said gating signal for applying said output signals to said control means.

15. Apparatus for reproducing handwritten inscriptions from first and second position signals representing the coordinates of the position of a pen on a record sheet as a function of time, when said position signals have been recorded as frequency modulations on first and second carriers having first and second center frequencies, respectively, simultaneously with a first reference signal at a third frequency, said apparatus comprising, means for simultaneously reproducing said recorded signals so that wow and flutter deviations in each signal are proportional to the wow and flutter deviations in the other signals, first, second and third filter means having matched delays and being selectively responsive to said reproduced first and second modulated carrier signals and to said reproduced first reference signal for producing corresponding equally delayed signals, first circuit means responsive to said delayed first reference signal for producing a first correction signal in which wow and flutter deviations are equal in amplitude to corresponding deviations in said delayed first position signal and having a center frequency offset from said first frequency, second circuit means responsive to said delayed first reference signal for producing a second correction signal in which wow and flutter deviations are equal in amplitude to corresponding deviations in said delayed second position signal and having a frequency offset from said second frequency, means for combining said delayed first position signal with said first correction signal to produce a first side band signal in which wow and flutter frequency deviations are substantially cancelled, means for combining said delayed second position signal with said second correction signal to produce a second side band signal in which wow and flutter deviations are substantially cancelled, means for offsetting the frequency of said first side band signal to produce a first output signal corresponding in modulated frequency to said first position signal, means for offsetting the frequency of said second side band signal to produce a second output signal corresponding in modulated frequency to said second position signal, a pen adapted to be moved to record an inscription on a record sheet, and means responsive to said output signals. for moving said pen to positions determined by said output signals.

16. A facsimile handwriting system for recording and later reproducing handwritten inscriptions, comprising a transmitter for producing signals corresponding to an inscription to be recorded and reproduced, record means for storing said signals and a receiver responsive to signals reproduced from said record for producing an inscription represented by said reproduced signals, said transmitter comprising a first stylus adapted to be manually manipulated to graphically record an inscription on a record sheet, first transducer means connected to said stylus for producing a first position signal comprising a first carrier frequency modulated in accordance with a first coordinate of the position of said stylus relative to a reference position, second transducer means connected to said stylus for producing a second position signal comprising a second carrier frequency modulated in accordance with a second coordinate of the position of said stylus relative to said reference position, means for producing a first reference signal at a first fixed frequency, and means for simultaneously recording said position signals and said first reference signal on said record, said receiver comprising means for simultaneously reproducing said signals from said record so that wow and flutter deviations in each signal are proportional to the wow and flutter deviations in the other signals, means for producing a second reference signal at a second fixed frequency, means for combining said reproduced first reference signal with said second reference signal to produce a first derived signal at a frequency offset from the frequency of said reproduced first reference signal by said second fixed frequency, first frequency dividing means responsive to said first derived signal for producing a second derived signal in which wow and flutter deviations are equal in amplitude to corresponding deviations in said reproduced first position signal and having a center frequency offset from the frequency of said first carrier, second frequency dividing means responsive to said first derived signal for producing a third derived signal in which wow and flutter deviations are equal in amplitude to corresponding deviations in said reproduced second position signal and having a frequency offset from the frequency of said second carrier, means for combining said reproduced first signal with said second derived signal to produce a first side band signal in which wow and flutter frequency deviations are substantially cancelled, means for combining said reproduced second signal with said third derived signal to produce a second side band signal in which wow and flutter deviations are substantially cancelled, means for producing a third reference signal at a third fixed frequency, means for combining said third reference signal and said first side band signal to produce a first output signal corresponding in modulated frequency to said first position signal, means for producing a fourth reference signal at a fourth fixed frequency, means for combining said fourth reference signal and said second side band signal to produce a second output signal corresponding to modulated frequency to said second position signal, a second stylus adapted to be moved to record an inscription on a record sheet, and means responsive to said output signals for moving said second stylus to positions determined by said output signals.

17. The apparatus of claim 16, in which the first position signal has frequency $np \pm \Delta f_1$, said second position signal has a frequency $mp \pm \Delta f_2$, said first reference signal has a frequency $mnp$, said second reference signal has a frequency $2mnp+nb$, said third reference signal has a frequency $np+(nb/m)$, and said fourth reference signal has a frequency $mp+b$, where $m$, $n$, $p$, and $b$ are constants, and $\Delta f_1$ and $\Delta f_2$ are frequency components representing said coordinates of the position of said first stylus, and in which said first frequency dividing means divides the frequency of said first derived signal by $m$, and said second frequency dividing means divides the frequency of said first derived signal by $n$.

18. The apparatus of claim 16, in which said means for combining said reproduced first reference signal with said second reference signal comprises frequency multiplying means responsive to said reproduced first reference signal for producing a signal having a frequency that is a predetermined multiple of the frequency of said first reproduced reference signal, modulating means responsive to said second reference signal for modulating the signal from said frequency multiplying means at the frequency of said second reference signal to produce a modulated signal, and filter means responsive to a predetermined side band of said modulated signal for producing said first derived signal.

19. The apparatus of claim 18, in which said first position signal has a frequency $np \pm \Delta f_1$, said second position signal has a frequency $mp \pm \Delta f_2$, said first reference signal has a frequency $mnp/K$, said second reference signal has a frequency $2mnp+nb$, said third reference signal has a frequency $np+(nb/m)$, and said fourth reference signal has a frequency $mp+b$, where $m$, $n$, $p$, $K$ and $b$ are constants and $\Delta f_1$ and $\Delta f_2$ are frequency components representing said coordinates of the position of said first stylus, and in which said predetermined multiple is $K$, said first frequency dividing means divides the frequency of said first derived signal by $m$, and said second frequency dividing means divides the frequency of said first derived signal by $n$.

* * * * *